United States Patent
Wan

(10) Patent No.: US 9,589,319 B2
(45) Date of Patent: Mar. 7, 2017

(54) METHOD, SYSTEM AND APPARATUS FOR FORMING A HIGH RESOLUTION DEPTH MAP

(71) Applicant: CANON KABUSHIKI KAISHA, Tokyo (JP)

(72) Inventor: Ernest Yiu Cheong Wan, Carlingford (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/835,475

(22) Filed: Aug. 25, 2015

(65) Prior Publication Data

US 2016/0063715 A1     Mar. 3, 2016

(30) Foreign Application Priority Data

Aug. 27, 2014   (AU) ................................ 2014218390

(51) Int. Cl.
  G06T 7/00     (2006.01)
  G06K 9/62     (2006.01)
  G06T 3/40     (2006.01)

(52) U.S. Cl.
  CPC ..................................... *G06T 3/40* (2013.01)

(58) Field of Classification Search
  CPC ........................................................ G06T 3/40
  See application file for complete search history.

(56) References Cited

U.S. PATENT DOCUMENTS 7,889,949 B2   2/2011  Cohen et al.
8,532,425 B2   9/2013  Ali et al.
9,406,140 B2 * 8/2016  Lee .......................... G06T 7/0075
2007/0092122 A1  4/2007  Xiao et al.
2012/0120192 A1* 5/2012  Alregib ...................... G06T 5/00
                                                                          348/43

(Continued)

FOREIGN PATENT DOCUMENTS

EP     2466901 A2      6/2012
WO  2011046607 A3      6/2011

OTHER PUBLICATIONS

Kopf, Johannes, Michael F. Cohen, Dani Lischinski, and Matt Uyttendaele. "Joint bilateral upsampling." ACM Transactions on Graphics (TOG), (Jul. 2007), vol. 26, No. 3, Article 96, pp. 96-1 through 96-5.

(Continued)

*Primary Examiner* — David F Dunphy
(74) *Attorney, Agent, or Firm* — Canon U.S.A., Inc. IP Division

(57) ABSTRACT

An input depth map is received having less resolution than an image. From a window region about an image pixel of the image, pixels are selected having a substantially similar characteristic value as the image pixel. A reference depth value is determined for the image pixel from depth values in the input depth map which correspond to each of the selected pixels. Weights are determined for each pixel within the window region based on a difference between a depth value corresponding to each of the selected pixels and the determined reference depth value for the image pixel. A refined depth value is determined for the image pixel from a weighted sum of the depth values corresponding to each of the selected pixels. A high resolution depth map corresponding to the image is determined from the refined depth value.

13 Claims, 10 Drawing Sheets

(56) References Cited

U.S. PATENT DOCUMENTS

| | | |
|---|---|---|
| 2012/0195492 A1 | 8/2012 | Ali et al. |
| 2012/0269458 A1 | 10/2012 | Graziosi et al. |
| 2014/0146139 A1 | 5/2014 | Schwartz et al. |
| 2014/0169701 A1 | 6/2014 | Cui |
| 2014/0253679 A1* | 9/2014 | Guigues .................. G01S 17/89 348/42 |
| 2015/0071526 A1* | 3/2015 | Nguyen .................... G06T 5/10 382/154 |

OTHER PUBLICATIONS

Lo, Kai-Han, et al., "Joint Trilateral Filtering for Depth Map Super-Resolution", Visual Communications and Image Processing (VCIP), 2013, Nov. 17-20, 2013, pp. 1-6, IEEE.

\* cited by examiner

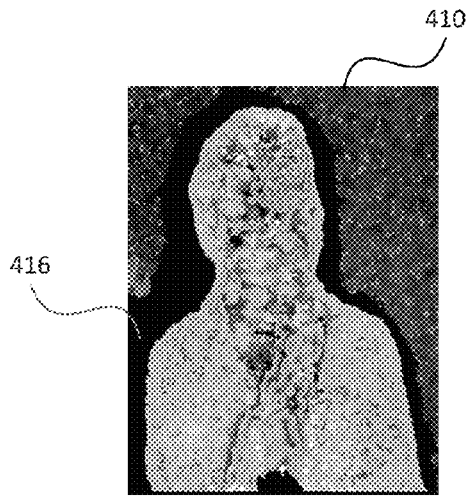
Fig. 4A
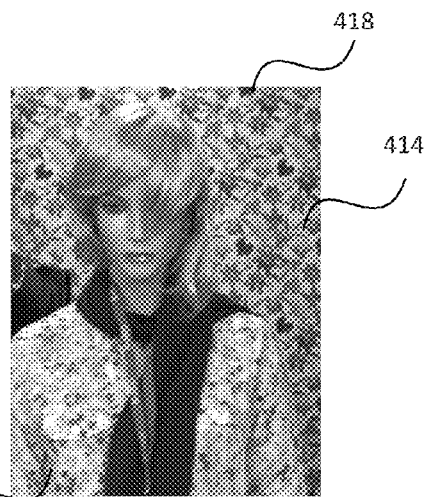
Fig. 4B
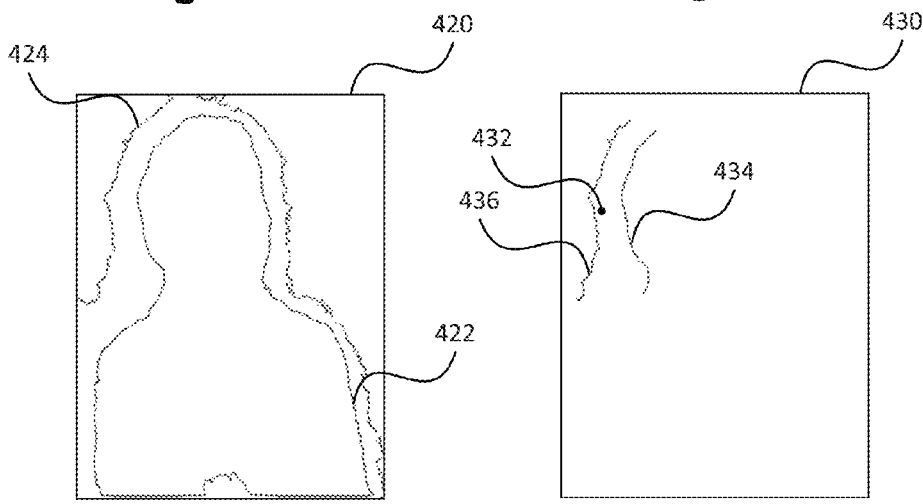
Fig. 4C
Fig. 4D
Fig. 4E

METHOD, SYSTEM AND APPARATUS FOR FORMING A HIGH RESOLUTION DEPTH MAP

REFERENCE TO RELATED PATENT APPLICATION(S)

This application claims the benefit under 35 U.S.C. §119 of the filing date of Australian Patent Application No. 2014218390, filed 27 Aug. 2014, hereby incorporated by reference in its entirety as if fully set forth herein.

TECHNICAL FIELD

The current invention relates to digital image processing and, in particular, to the refinement of a depth map produced by depth-from-defocus (DFD) methods. The present invention also relates to a method and apparatus for forming a high resolution depth map, and to a computer program product including a computer readable medium having recorded thereon a computer program for forming a high resolution depth map.

BACKGROUND

In many applications of image capture, it can be advantageous to determine the distance from the image capture device to objects within the field of view of the image capture device. A collection of such distances to objects in an imaged scene may be referred to as a depth map. A depth map of an imaged scene may be represented as an image, which may be of a different pixel resolution to the image of the scene itself. In the depth map, the distance to objects corresponding to each pixel of the depth map is represented by a greyscale or colour value.

A depth map can be useful in the fields of photography and video, as a depth map enables several desirable post-capture image processing capabilities. For example, a depth map can be used to segment foreground and background objects to allow manual post-processing, or the automated application of creative visual effects. A depth map can also be used to apply depth-related visual effects such as simulating aesthetically pleasing graduated blur of a high-quality lens using a smaller and less expensive lens.

Depth estimation may be performed by depth from defocus (DFD) using a single camera by capturing two or more images with different focus or aperture settings and analysing relative blur between corresponding tiles of images. Depth from defocus is a flexible method because the depth from defocus method uses a single standard camera without special hardware modifications. The same camera can be used for image or video capture and also for depth capture.

The size of the tiles used in the depth from defocus method affects the depth estimates. The larger the size of the tiles, the less noisy the depth estimates over regions of similar depth. On the other hand, the spatial resolution at depth boundaries is reduced. Along depth boundaries, the depth from defocus method assumes a constant depth (over a tile) is also violated and the depth estimates are inaccurate. The depth from defocus methods also generate very noisy or no depth estimates in regions with little texture. As a result, depth from defocus depth maps often need to be refined to reduce noise in depth estimates and align depth boundaries with object edges.

A joint bilateral filter (JBF) has been used for up-sampling low resolution data including depth maps given an associated high resolution image. Using the high resolution image as a prior, a joint bilateral filter smooths out data while preserving discontinuities in the data that coincide with the edges in the image. When filtering a depth map, the depth at each pixel of the image is replaced by a weighted average of the depth values of the pixels in a local window of the pixel. The weights depend on both the spatial distance (a function of pixel location, the domain variable) and the difference in intensity or colour (the range variable) between the pixels—hence, the name "bilateral".

Local pixels that are closer to a current pixel and whose intensity or colours are closer to a pixel are given more weights when estimating the depth of the pixel. However, depth maps are typically noisy with misaligned depth and object boundaries. Hence, local pixels that are similar in intensity or colour might not have the correct depth especially for pixels that are close to depth boundaries. While either image intensity or colour can be used as a range variable in the formulation of a joint bilateral filter and extensions of the joint bilateral filter, present specification will only refer to the use of the colour range variable to simplify the description.

A joint bilateral filter has been extended by adding a range filter on depth (in addition to the location weight and colour weight of the joint bilateral filter) so that weights of local pixels also depend on depth values. The extension of the joint bilateral filter results in lower weights to local pixels that have a different depth value to that of a current pixel even if intensity and colour of the local pixels are similar to the intensity and colour of the current pixel. The extension of the joint bilateral filter should help to preserve depth discontinuities over regions of an image where different depth layers with similar intensity and colour met. Unfortunately, since depth maps are typically noisy with misaligned depth and object boundaries, the additional range filter on depth tends to amplify noise and exacerbate depth/object boundaries misalignment. As a result, a better method of utilising depth data is required.

In addition, since the depth from defocus method relies on relative blur between two or more images for estimating depth, object and camera motion in between the capture of the images may result in occluded regions that appeared in only one of the images and produced no depth estimate. For the occluded regions, the missing depth estimates have to be first interpolated from the available depth estimates surrounding the occluded regions before a joint bilateral filter can be applied to refine the depth map.

SUMMARY

It is an object of the present invention to substantially overcome, or at least ameliorate, one or more disadvantages of existing arrangements.

According to one aspect of the present disclosure there is provided a method of determining a high resolution depth map corresponding to an image of a scene, said method comprising:

receiving the image and an input depth map corresponding to the image;

selecting, from a window region about an image pixel of the image, a plurality of pixels having a substantially similar characteristic value as the image pixel;

determining a reference depth value for the image pixel from depth values in the input depth map which correspond to each of the selected pixels;

determining weights for each pixel within the window region based at least on a difference between a depth value corresponding to each of the selected pixels and the determined reference depth value for the image pixel;

determining a refined depth value for the image pixel from a weighted sum of the depth values corresponding to each of the selected pixels, said depth values being weighted in accordance with the determined weights; and determining a high resolution depth map corresponding to the image from the refined depth value.

According to another aspect of the present disclosure there is provided a system for determining a high resolution depth map corresponding to an image of a scene, said system comprising:

a memory for storing data and a computer program;

a processor coupled to the memory for executing the computer program, the computer program comprising instructions for:

receiving the image and an input depth map corresponding to the image;

selecting, from a window region about an image pixel of the image, a plurality of pixels having a substantially similar characteristic value as the image pixel;

determining a reference depth value for the image pixel from depth values in the input depth map which correspond to each of the selected pixels;

determining weights for each pixel within the window region based at least on a difference between a depth value corresponding to each of the selected pixels and the determined reference depth value for the image pixel;

determining a refined depth value for the image pixel from a weighted sum of the depth values corresponding to each of the selected pixels, said depth values being weighted in accordance with the determined weights; and determining a high resolution depth map corresponding to the image from the refined depth value.

According to still another aspect of the present disclosure there is provided an apparatus for determining a high resolution depth map corresponding to an image of a scene, said apparatus comprising:

means for receiving the image and an input depth map corresponding to the image;

means for selecting, from a window region about an image pixel of the image, a plurality of pixels having a substantially similar characteristic value as the image pixel;

means for determining a reference depth value for the image pixel from depth values in the input depth map which correspond to each of the selected pixels;

means for determining weights for each pixel within the window region based at least on a difference between a depth value corresponding to each of the selected pixels and the determined reference depth value for the image pixel;

means for determining a refined depth value for the image pixel from a weighted sum of the depth values corresponding to each of the selected pixels, said depth values being weighted in accordance with the determined weights; and means for determining a high resolution depth map corresponding to the image from the refined depth value.

According to still another aspect of the present disclosure there is provided a non-transitory computer readable medium having a computer program stored thereon for determining a high resolution depth map corresponding to an image of a scene, said program comprising:

code for receiving the image and an input depth map corresponding to the image;

code for selecting, from a window region about an image pixel of the image, a plurality of pixels having a substantially similar characteristic value as the image pixel;

code for determining a reference depth value for the image pixel from depth values in the input depth map which correspond to each of the selected pixels;

code for determining weights for each pixel within the window region based at least on a difference between a depth value corresponding to each of the selected pixels and the determined reference depth value for the image pixel;

code for determining a refined depth value for the image pixel from a weighted sum of the depth values corresponding to each of the selected pixels, said depth values being weighted in accordance with the determined weights; and code for determining a high resolution depth map corresponding to the image from the refined depth value.

Other aspects of the invention are also disclosed.

BRIEF DESCRIPTION OF THE DRAWINGS

One or more embodiments of the invention will now be described with reference to the following drawings, in which:

FIG. 4A shows a depth map with missing depth estimates caused by occlusion;

FIG. 4B shows an image corresponding to the depth map of FIG. 4A;

FIG. 4C shows a set of available depth estimates surrounding an occluded region in the depth map of FIG. 4A;

FIG. 4D shows a subset of depth estimates selected for interpolating the depth of one of the pixels in an occluded region in the depth map of FIG. 4A;

FIG. 4E shows a depth map determined for the image of FIG. 4B using a method of FIG. 8;

DETAILED DESCRIPTION INCLUDING BEST MODE

The present disclosure is directed to providing methods of refining a noisy, low resolution depth map of a high resolution image. The described methods improve accuracy, spatial resolution and object/depth boundaries alignment of the depth map.

The described methods may be implemented on a variety of hardware platforms, including in an imaging device such as a camera, or on a general purpose computer (PC), or in a cloud computing implementation.

Figure 1A:
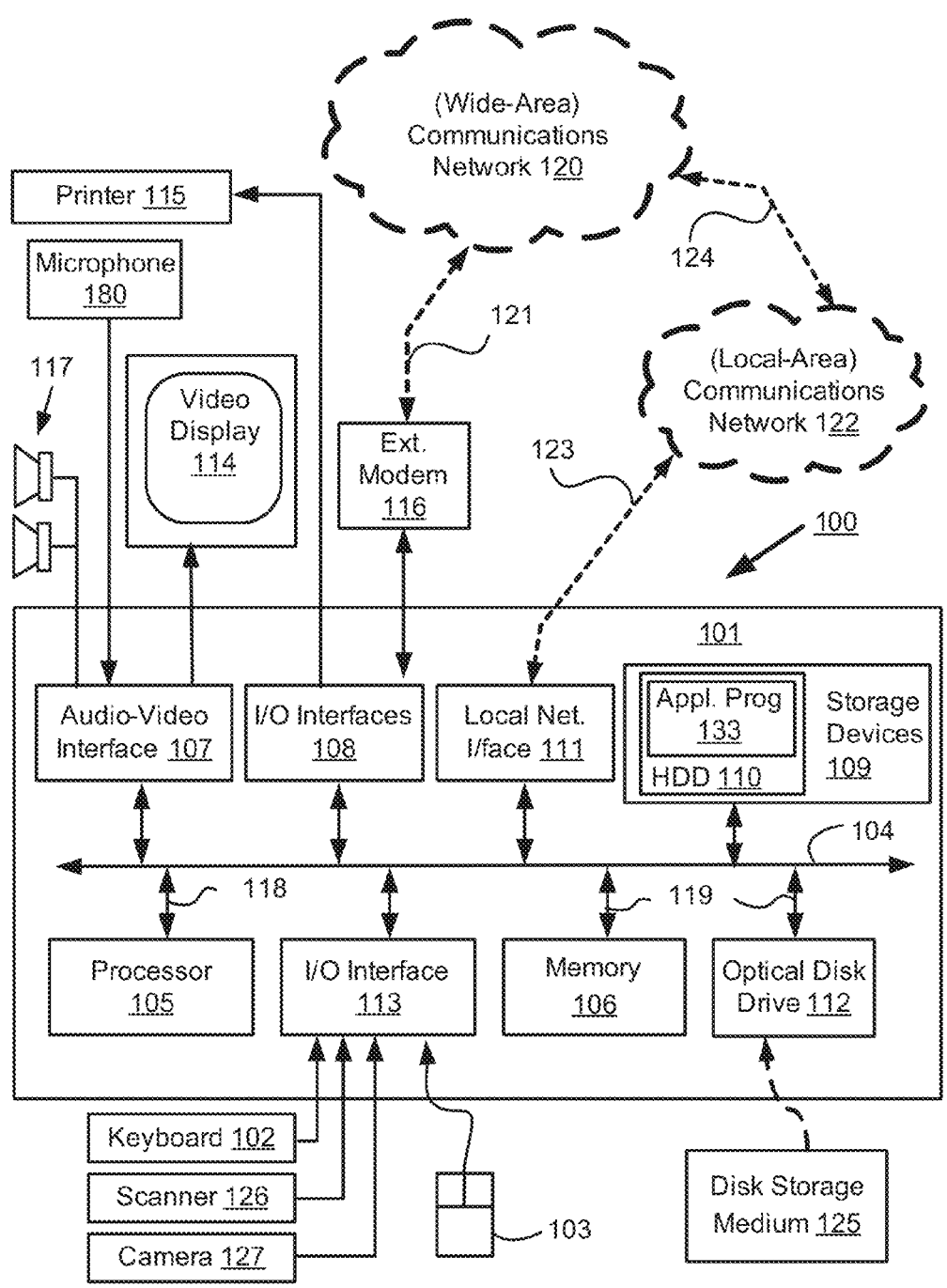
FIGS. 1A and 1B form a schematic block diagram of a general purpose computer upon which arrangements described can be practised.
Figure 1B:
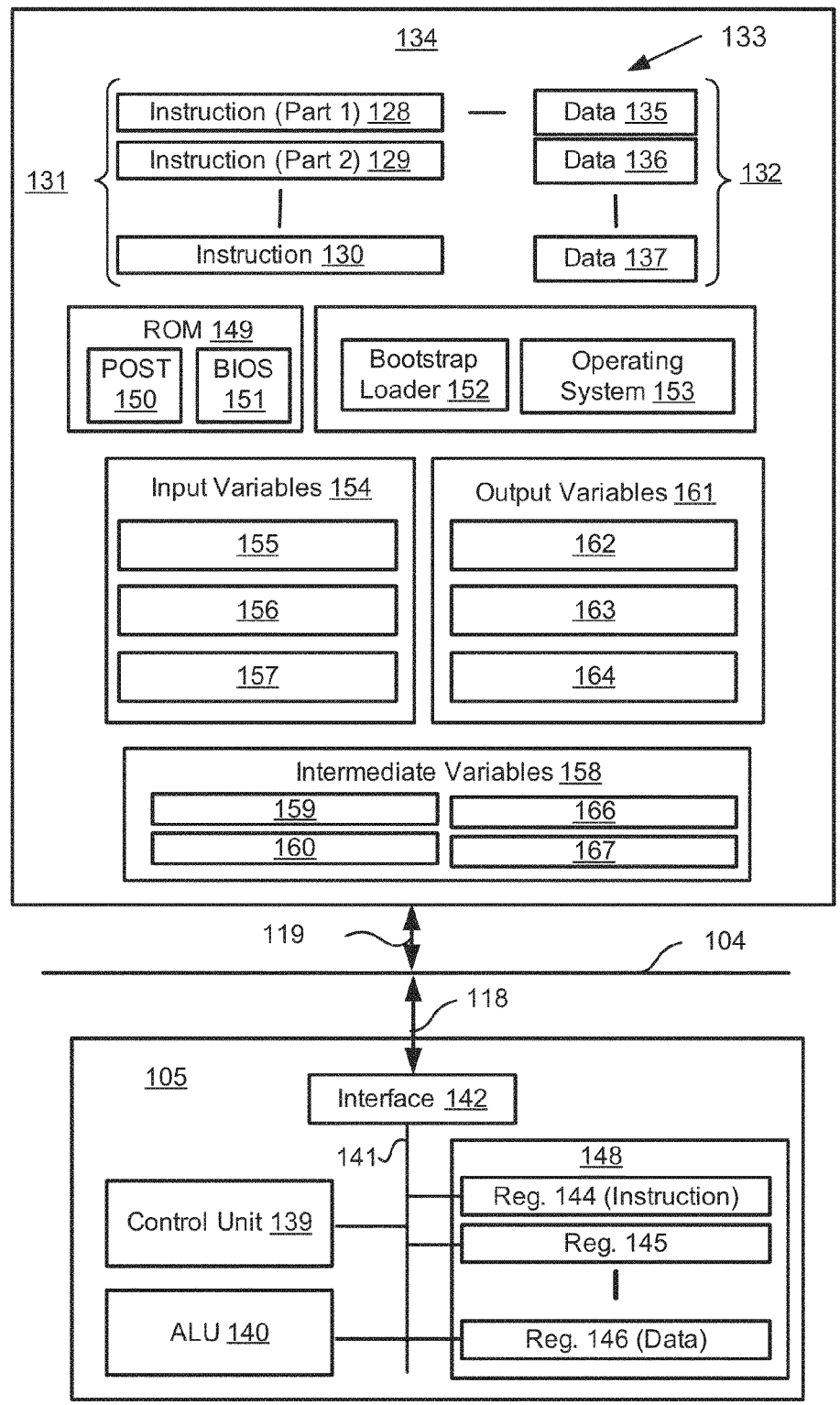

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. The camera 127 may be a still camera or a video camera. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

The described methods may be implemented using the computer system 100 wherein the processes of FIGS. 1 to 9, to be described, may be implemented as one or more software application programs 133 executable within the computer system 100. In particular, the steps of the described methods are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically include a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The described methods use input variables 154, which are stored in the memory 134 in corresponding memory locations 155, 156, 157. The described methods produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2 to 9 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

In one arrangement, the camera 127 may implement depth refinement algorithmic processes in order to refine depth maps of captured images to provide a refined depth map for various purposes. The refined depth map may be used for artificially blurring the background of portrait images to achieve a pleasing aesthetic. The refined depth map may alternatively be used for attaching depth information as image metadata to enable various post-processing operations. In one arrangement, the camera 127 may capture an image of a scene together with a depth map using an active method such as time-of-flight. Alternatively, the camera 127 may capture multiple images of a scene and generate a depth map from the captured images using a passive depth acquisition method such as depth from defocus (DFD). The depth map generated by the camera 127 may then be refined in embedded devices of the camera 127. The refined depth map generated by the camera 127 may be retained in a memory of the camera 127 or the refined depth map may be written to a memory card or other memory storage device connectable to the camera 127. Alternatively, the depth map generated by the camera 127 may be uploaded to a cloud computing server connected to the network 120 for later retrieval by a user.

In another arrangement, the computer module 101 or the like may implement a depth refinement method as one or more software modules of the software application program 133 to enable post-capture processing of images. Depth maps corresponding to the images may be refined to generate refined depth maps, which a user can use for image segmentation or further image processing operations. In the case where depth from defocus (DFD) is used for generating depth maps, the camera 127 may capture multiple images of a scene, the images being suitable for application of the depth from defocus (DFD) process. The images may be retained in the memory 106 or written to a memory card or other memory storage device. At a later time, the images may be transferred to the computer module (e.g. 101), where the depth from defocus (DFD) process uses the images as input to produce a depth map required for the depth refinement process.

In yet another arrangement, a cloud computing server or the like connected to the network 120 may implement both the depth from defocus (DFD) and the depth refinement processing in software to enable post-capture processing of images to generate depth estimates. In such a cloud computer server arrangement, the camera 127 captures multiple images of a scene. The images captured by the camera 127 are then uploaded to the cloud computing server, where subsequent steps of the depth from defocus (DFD) use the images as input to generate depth maps. The cloud computing server then refines the depth maps and may then download the refined depth maps back to the camera 127, or store the refined depth maps for later retrieval by the user.

Joint Bilateral Filter

A conventional joint bilateral filter (JBF) may be used for upsampling low resolution data including depth maps given an associated high resolution image. Using the high resolution image as a prior, the joint bilateral filter (JBF) smooths out data while preserving discontinuities in the data that coincide with the edges in the image. When filtering a depth map, the depth at each pixel of the image is replaced by a weighted average of the depth values of the pixels in a local window of the pixel. The weights depend on both the spatial distance (a function of pixel location, the domain variable) and the difference in colour (the range variable) between the pixels. More specifically, the depth of a pixel at a location p, $\hat{D}_p$, is determined in accordance with Equation (1) as follows:

$$\hat{D}_p = \frac{1}{Z_p} \sum_{q \in A} w(q, p) D_q \qquad (1)$$

where p, q are pixel locations, A is a local window of p, $D_q$ is a depth value at location q, w(q, p) is a bilateral weight for $D_q$, and $Z_p$ is a normalisation factor. The normalisation factor $Z_p$ is determined in accordance with Equation (2) as follows:

$$Z_p = \Sigma_{q \in A} w(q, P) \qquad (2)$$

The bilateral weight w(q, p) is defined in accordance with Equation (3) as follows:

$$w(q,p) = G_{\sigma_s}(\|q-p\|) G_{\sigma_r}(\|I_q - I_p\|) \qquad (3)$$

where $\|\cdot\|$ denotes a Euclidean distance, $I_p$ is a colour vector of the pixel at location p, $G_{\sigma_s}(\cdot)$ is a Gaussian location weight with a predefined spread of $\sigma_s$, $G_{\sigma_r}(\cdot)$ is a Gaussian colour weight with a predefined spread of $\sigma_r$. For depth filtering, $\sigma_s$ is set according to spatial resolution of the depth data as will be described in detail below. The predefined spread $\sigma_r$ may be set to ⅕₂₅ the value range of the colour components of the image.

Additional Range Filter on Depth

The conventional joint bilateral filter (JBF) may be extended to include an additional range filter on depth, to generate an extended joint bilateral filter (JBF) whose bilateral weight w(q, p) has a form in accordance with Equation (4), as follows:

$$w(q,p) = G_{\sigma_s}(\|q-p\|) G_{\sigma_r}(\|I_q - I_p\|) G_{\sigma_d}(\|D_q - D_p\|) \qquad (4)$$

where $G_{\sigma_d}(\cdot)$ is a Gaussian range filter on depth with a predefined spread of $\sigma_d$. The additional range filter on depth assigns lower weights to local pixels that have similar depth values to that of the current pixel at p even if the intensity and colour of the local pixels are similar to those of the current pixel. The additional range filter on depth may help to preserve depth discontinuities over regions of an image where different depth layers with similar intensity and colour met. Unfortunately, since depth maps are typically noisy with misaligned depth and object boundaries, the additional range filter on depth tends to amplify noise and exacerbate depth/object boundaries misalignment.

Figure 2A:
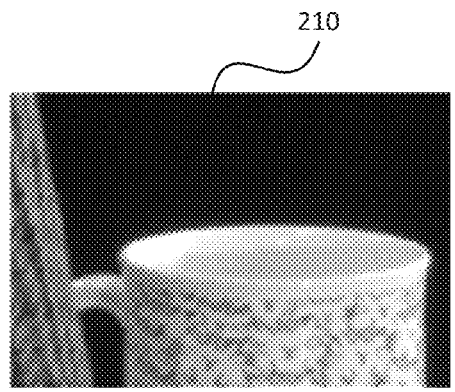
FIG. 2A shows an example image.
Figure 2B:
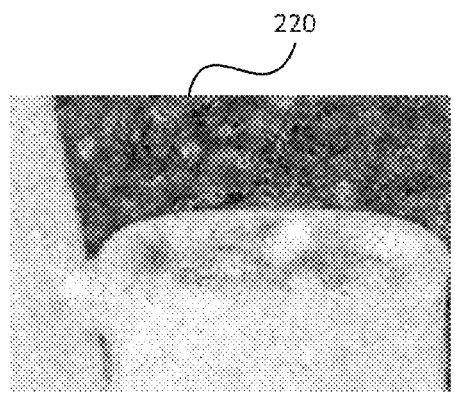
FIG. 2B shows a depth from defocus (DFD) depth map associated with the image of FIG. 2A.

In one example, which will be described with reference to FIGS. 2A to 2E, the conventional joint bilateral filter (JBF) and the extended joint bilateral filter (JBF) are applied to image 210 of FIG. 2A and to a depth from defocus (DFD) depth map 220 associated with the image 210. In the example of FIGS. 2A and 2B, pixels further away from the camera 127 are darker in the depth map. The image 210 consists of a part of the sleeve of a jacket and a mug in the foreground against a dark background. The highly textured jacket and outer surface of the mug are given similar foreground depth values in the depth map 220 while lowly textured regions in image 210, such as the dark background and the inner surface of the mug, are pulled towards the background in the depth map 220. The depth map 220 is typical of depth maps produced by various depth from defocus (DFD) methods. There is a significant amount of noise and the depth boundaries misalign considerably with actual object boundaries.

Figure 2C:
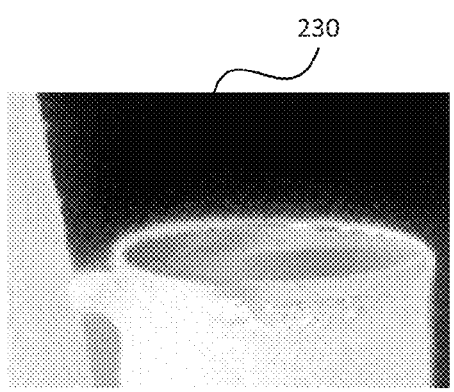
FIG. 2C shows a refined depth map produced for the image of FIG. 2A by a conventional joint bilateral filter (JBF)
Figure 2D:
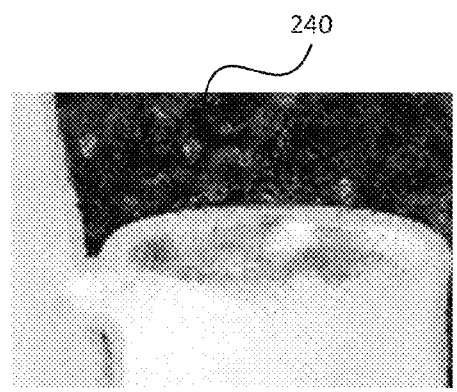
FIG. 2D shows a refined depth map produced for the image of FIG. 2A by an extended joint bilateral filter (JBF)

As seen in FIG. 2C, a refined depth map 230 is produced by the conventional joint bilateral filter (JBF) described above having a bilateral weight w(q, p) defined by Equation (3) above. Refined depth map 240 as seen in FIG. 2D is produced by the extended joint bilateral filter (JBF) having a bilateral weight defined by Equation (4) above. Comparing the refined depth map 240 with the input depth map 220, the stronger noise in original depth map is strengthened by the additional range filter on depth in Equation (4). In addition, misalignment between depth and object boundaries in the input depth map 220 remained in the refined depth map 240. In contrast, the noise in the background of the depth map 220 has been mostly removed from the refined depth map 230 produced by the conventional joint bilateral filter (JBF). While the misalignment between the depth and object boundaries has also been reduced in the refined depth map 230, the depth boundaries appeared fuzzy and significant misalignment between depth and object boundaries remained.

Determining Reference Depth for Range Filter on Depth

Instead of basing a range filter on depth on the (unreliable) depth value of a current pixel p that is being filtered as in Equation (4), a range filter may be based on a more reliable reference depth value determined from selected pixels that have a similar characteristic to the current pixel within a local window of window A of pixel p. For example, pixels may be selected if the pixels have similar colours to pixel p. The bilateral weights w(q, p) may be based on Equation (5), as follows:

$$w(q,p)=G_{\sigma_s}(\|q-p\|)G_{\sigma_r}(\|I_q-I_p\|)G_{\sigma_d}(\|D_q-D_{ref(p)}\|) \quad (5)$$

where $D_{ref(p)}$ is a reference depth value for the current pixel p determined from similar pixels in a local window A of pixel p.

To obtain a reliable reference depth value, more similar pixels with correct depth than incorrect depth need to be located in the local window A of pixel p. The required size of the local window A is first estimated from the spatial resolution of the input depth map. For a depth from defocus (DFD) depth map generated using an m×m window (or tile), the spatial resolution is typically around m/2 pixels. Hence, the local window A has to be larger than $2m^2$ pixels, or for a square local window, has a width of at least $\sqrt{2}m=1.414m$ pixels. In one arrangement, the local window A is a square local window with a width of 1.5m pixels.

Figure 2E:
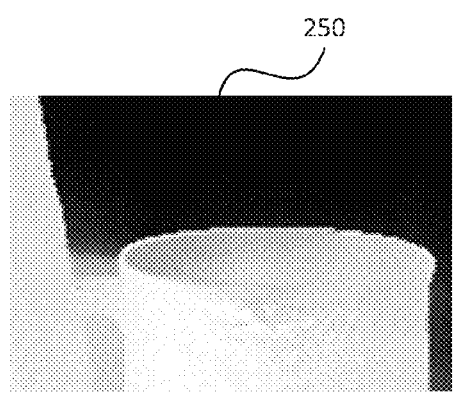
FIG. 2E shows a refined depth map produced for the image of FIG. 2A by an extended joint bilateral filter (JBF) of Equation (5)

To determine a reference depth for the current pixel p, in one arrangement, the colour weights, $G_{\sigma_r}(\|I_q-I_p\|)$, of the local pixels q in the local window A of the current pixel p are first determined and sorted. The local pixels with the highest 20% of the colour weights are selected as a set of similar pixels to the current pixel p. The median depth of the pixels of the set of similar pixels is used as a reference depth value for p, $D_{ref(p)}$, while the standard deviation (STD) of the depth value of the pixels of the set of similar pixels is used for, $\sigma_d$, the spread of the Gaussian range filter on depth, $G_{\sigma_d}(\cdot)$. The median depth of the pixels of the set of similar pixels is used because the median depth is robust to outliners. FIG. 2E shows a refined depth map 250 produced by such an extension of the joint bilateral filter (JBF) whose bilateral weights are based on Equation (5), given the input depth map 220 and the associated image 210. As with the refined depth map 230 of the conventional joint bilateral filter (JBF), the noise in the background of the depth map 220 is mostly removed in the refined depth map 250. In addition, the depth across the mug and the jacket are more consistent, and the depth and object boundaries are more accurately aligned in the refined depth map 250 than in the refined depth map 230 of the conventional joint bilateral filter (JBF) described above.

In another arrangement, a minimum number of similar pixels m may be used for determining the reference depth value $D_{ref(p)}$ and a minimum threshold $\theta_{min}$ ($\theta_{min}$=0.8) on the colour weights, $G_{\sigma_r}(\|I_q-I_p\|)$, are predefined. The colour weights of the local pixels q in the local window A of the current pixel p are determined and sorted. The local pixels with colour weights higher than $\theta_{min}$ are selected. If the number of selected pixels is larger than m, the bilateral weight of Equation (5), is applied. Otherwise, the original bilateral weight of Equation (3), is used. That is, the additional range filter on depth is used if there is a sufficient number of similar local pixels for determining a reliable reference depth value. When the range filter on depth is used, the median depth of the selected local pixels is again used as the reference depth value of p, $D_{ref(p)}$, while the standard deviation (STD) of the depth value of the selected pixels is used for, $\sigma_d$, the spread of the Gaussian range filter on depth, $G_{\sigma_d}(\cdot)$. In one arrangement, n may be set to the number of local pixels in A and $\theta_{min}$ may be set to 0.8.

Figure 5:
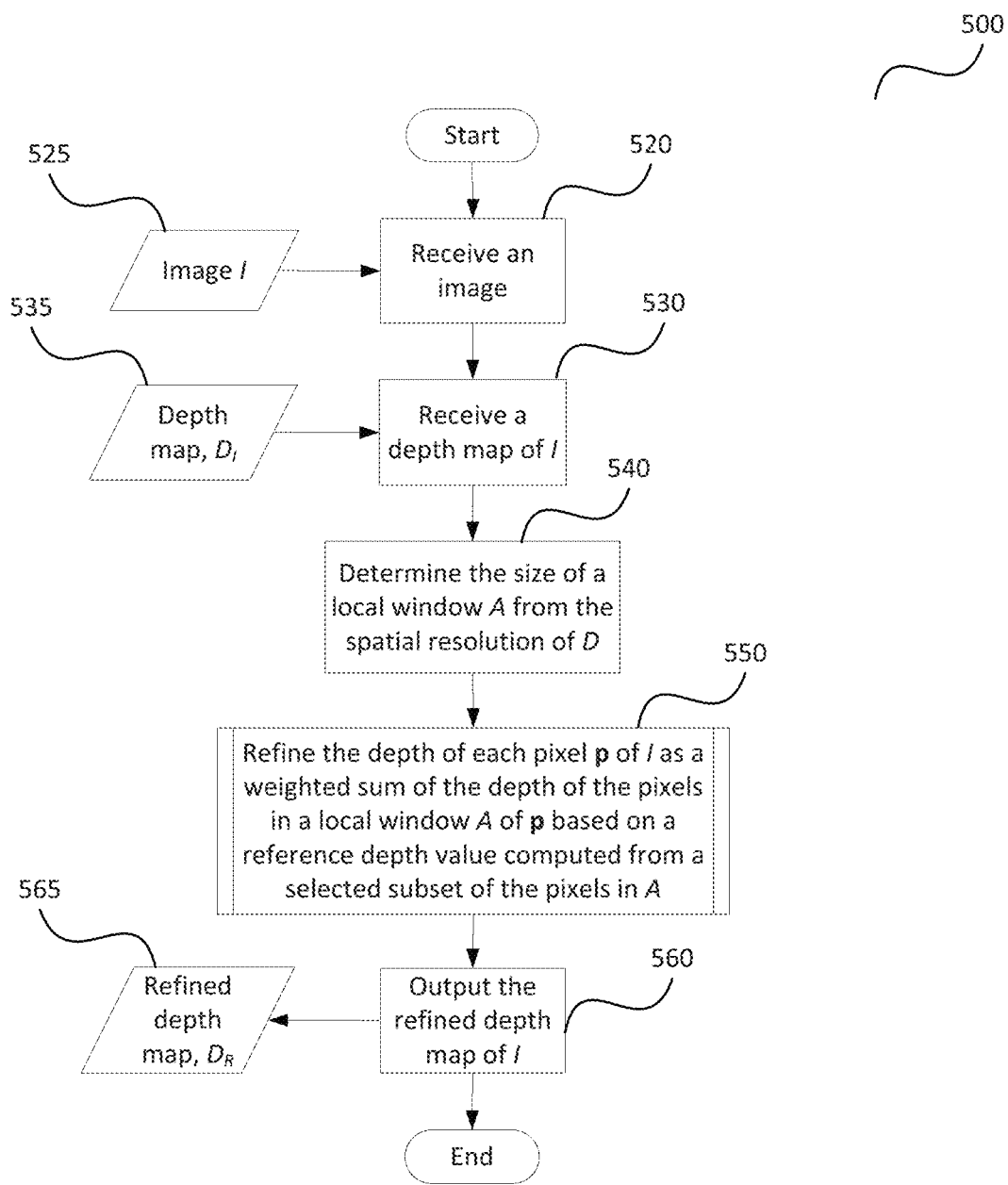
FIG. 5 is a schematic flow diagram showing a method of determining a high resolution depth map corresponding to an image of scene.

FIG. 5 is a flow chart showing a method 500 of determining a high resolution depth map corresponding to an image I 525 of a scene. The method 500 may be implemented as one or more software code modules of the software application program 133 resident on the hard disk drive 110 and being controlled in its execution by the processor 105.

The method 500 begins at receiving step 520, where an image I 525 is received as input, under execution of the processor 105. The image I 525 may be stored in the memory 106 by the processor 105 upon the image I 525 being received. In one arrangement, the image I 525 may be created by a software application program, such as the software application program 133, executing on the computer 101. In still another arrangement, the image I 525 may be created by a software application program executing on a remote server or the like connected to the network 120. The image I 525 may be accessed by the processor 105 at step 520 from the memory 110, the disk storage medium 125, or from an external data source (e.g., within the remote server) accessed via the network 120.

At a next receiving step 530, a low-resolution depth map $D_I$ 535 corresponding to the image I 525 is received as input, under execution of the processor 105. Again, the low-resolution depth map $D_I$ 535 of the image I 525 may be stored in the memory 106 upon the depth map $D_I$ 535 being received. In one arrangement, the depth map $D_I$ 535 may be created by a software application program, such as the software application program 133, executing on the computer 101. In still another arrangement, the depth map $D_I$ 535 may be created by a software application program executing on a remote server or the like connected to the network 120. the low-resolution depth map $D_I$ 535 of the image I 525 may accessed by the processor 105 at step 530 from the memory 110, the disk storage medium 125, or from an external data source (e.g., within the remote server) accessed via the network 120. The low-resolution depth map $D_I$ 535 has a spatial resolution less than the resolution of the image I 525. In one arrangement, the low-resolution depth map $D_I$ 535 may have a spatial resolution that is the same as the resolution of the image I 525.

Then at determining step 540, based on the spatial resolution of the depth map 535, the size of a local window A is determined under execution of the processor 105. For a depth map 535 with a spatial resolution of n pixels, a local window of at least 3n by 3n is determined at step 540.

The method 500 continues at determining step 550, where a refined depth value is determined for each image pixel p of the image I 525. The refined depth value determined at step 550 for the image pixel p is determined from a weighted sum of the depth values corresponding to each of the pixels in the local window region A of the image pixel p or a random subset of the pixels in the local window region A of the image pixel p. The depth values are weighted in accordance with determined weights as described below.

Each refined depth value is determined at step 550 based on a reference depth value determined from the selected plurality of pixels in the local window region A that are similar to the image pixel p. A reference depth value is determined for the image pixel p from depth values in the input depth map which correspond to each of the selected pixels. The reference depth value is used for determining weights for each pixel within the window region A. The weights are determined based at least on a difference between a depth value corresponding to each of the selected pixels and the determined reference depth value for the image pixel p.

Figure 6:
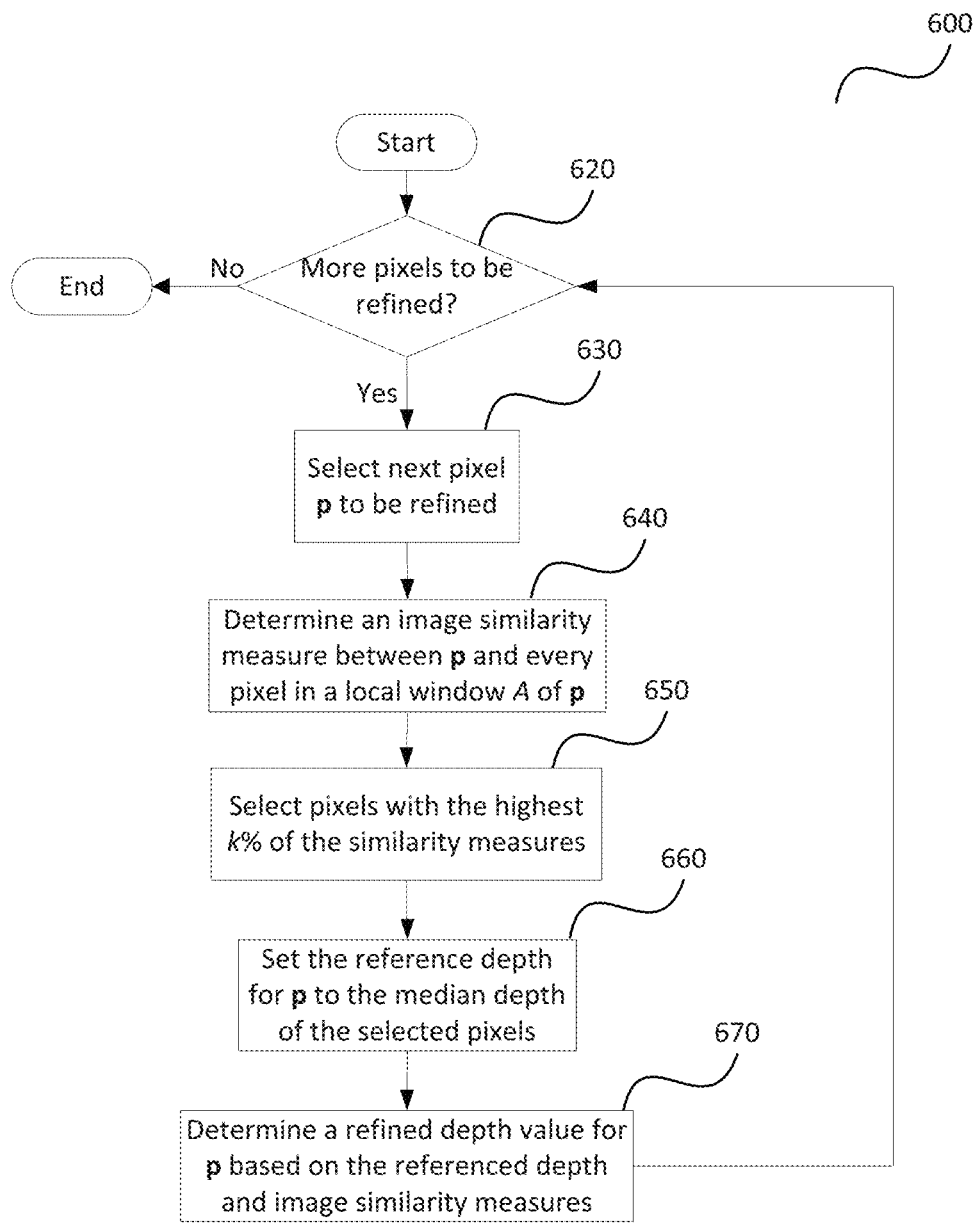
FIG. 6 is a schematic flow diagram showing a method of determining a refined depth value, as used in the method of FIG. 5.

A method 600 of determining a refined depth value, as executed at step 550, will be described in detail with reference to FIG. 6. A method 700 of determining a refined depth value, which may be alternatively executed at step 550, will be described in detail with reference to FIG. 7.

The method 500 concludes at determining step 560, where a refined depth map $D_R$ 565 corresponding to the image I 525 is determined from the refined depth values determined at step 550 is output to a data sink (not shown) over the network 120. Alternatively, the refined depth map $D_R$ 565 may be stored in the memory unit 106 or the disk storage medium 125. In still another arrangement, the refined depth map $D_R$ 565 may be passed to a software application program, such as the software application program 133, executing on the computer 101. The refined depth map $D_R$ 565 is a high resolution depth map.

The method 600 of determining a refined depth value, as executed at step 550, will now be described in detail with reference to FIG. 6. The method 600 may be implemented as one or more software code modules of the software application program 133 resident on the hard disk drive 110 and being controlled in its execution by the processor 105.

The method 600 begins at checking step 620, where the processor 105 is used for checking whether there are more pixels of the image I 525 to be refined. If there are no more pixels to be refined, the method 600 terminates. Otherwise, if there are more pixels to be refined, the method 600 proceeds to selecting step 630.

At selecting step 630, a next image pixel p of the image I 525 to be refined is selected under execution of the processor 105.

Then at determining step 640, an image similarity measure between the selected image pixel p and every pixel in a local window region A of the selected image pixel p is determined under execution of the processor 105. Thus, an image similarity measure between the selected image pixel p and at least one of a plurality of pixels in the local window region A is determined at step 640. In one arrangement, the colour weights, $G_{\sigma_r}(\|I_q - I_p\|)$, between the selected image pixel p and the local pixels q in the local window region A of the image pixel p are used as the similarity measures.

The method 600 continues at selecting step 650, where the similarity measures determined at step 640 are sorted and the local pixels with the highest k % of the similarity measures are selected. In one arrangement, k is set to twenty (20). Then, at setting step 660, the reference depth for the selected image pixel p is set to the median depth of the local pixels selected in step 650.

The method 600 continues at determining step 670, where a refined depth value is determined for the selected image pixel p based on the reference depth value determined in step 660 and the image similarity measures determined in step 640. In one arrangement, the refined depth value for image pixel p is determined as a weighted sum of the depth values corresponding to the selected local pixels in the local window region A of the selected image pixel p using Equation (1) and the bilateral weights of Equation (5). Accordingly, the depth values are weighted in accordance with determined weights. The standard deviation (STD) of the depth value of the selected local pixels is used to determine $\sigma_d$—the spread of the Gaussian range filter on depth, when calculating $G_{\sigma_d}(\bullet)$ in Equation (5). After determining the refined depth value for selected image pixel p in step 670, the method 600 returns to step 620 to check whether there are more pixels of the image I 525 to process.

Figure 7:
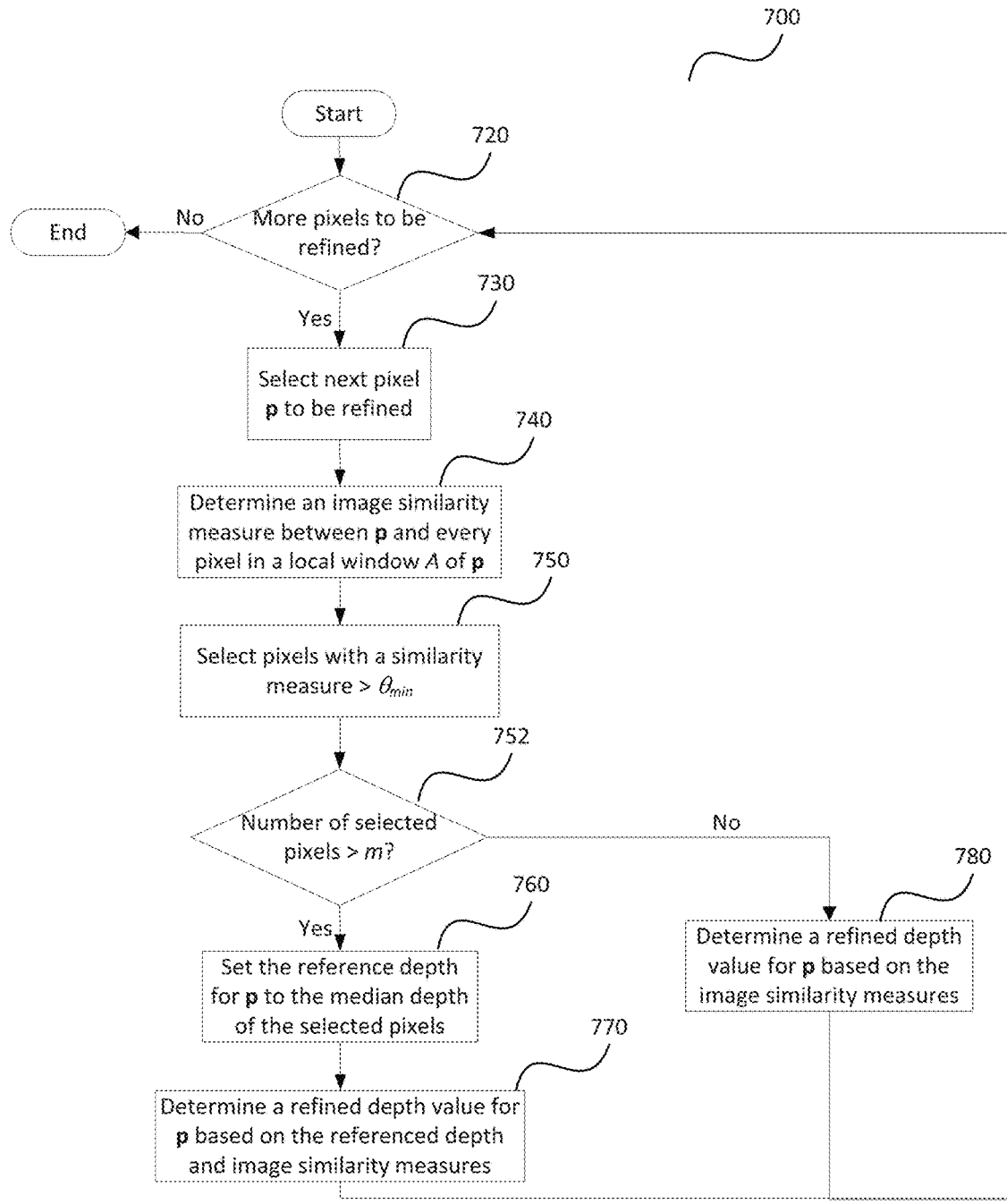
FIG. 7 is a schematic flow diagram showing another method of determining a refined depth value, as used in the method of FIG. 5.

A method 700 of determining a refined depth value, which may be alternatively executed at step 550, will now be described in detail with reference to FIG. 7. The method 700 may be implemented as one or more software code modules of the software application program 133 resident on the hard disk drive 110 and being controlled in its execution by the processor 105.

The method 700 begins at checking step 720, where the processor 105 is used for checking whether there are more pixels of the image I 525 to be refined. If there are no more pixels to be refined, the method 700 terminates. Otherwise, if there are more pixels to be refined, the method 700 proceeds to selecting step 730.

At selecting step 730, a next image pixel p to be refined is selected under execution of the processor 105. Then at determining step 740, an image similarity measure between the selected image pixel p and every pixel in a local window region A of the selected image pixel p is determined under execution of the processor 105. In one arrangement, the colour weights, $G_{\sigma_r}(\|I_q - I_p\|)$, between the selected image pixel p and the local pixels q in the local window region A of the selected image pixel p are used as the similarity measures.

The method 700 continues at selecting step 750, where the similarity measures determined at step 740 are sorted and the local pixels whose similarity measures are larger than a predetermined threshold $\theta_{min}$ are selected. In one arrangement, the predetermined threshold, $\theta min$, is set to 0.8.

Then at a checking step 752, the number of selected local pixels are checked against a predetermined minimum number of selected pixels m, under execution of the processor 105. In one arrangement, m is set to ⅛ the number of local pixels in the local window region A. If the number of selected local pixels is larger than m, then the method 700 proceeds to setting step 760. Otherwise, the method 700 proceeds to step 780. At step 760, the reference depth for the selected image pixel p is set, under execution of the processor 105, to the median depth of the local pixels selected at step 750.

The method 700 then proceeds to determining step 770, where a refined depth value is determined for the selected image pixel p based on the reference depth value determined in step 760 and the image similarity measures determined in step 740. In one arrangement, the refined depth value for the image pixel p is determined as a weighted sum of the depth values corresponding to the selected local pixels in the local window region A of the selected image pixel p using Equation (1) and the bilateral weights of Equation (5). Accordingly, the depth values are weighted in accordance with determined weights. The standard deviation (STD) of the depth value of the selected local pixels is used to determine $\sigma_d$—the spread of the Gaussian range filter on depth, when calculating $G_{\sigma_d}(\bullet)$ in Equation (5).

However, if the number of selected local pixels is determined to be less than or equal to m in step 752, then the method 700 proceeds to step 780. At step 780, a refined depth value for image pixel p is determined based on the image similarity measures determined in step 740. In one arrangement, the refined depth value for image pixel p is determined as a weighted sum of the depth values corresponding to the selected local pixels in the local window region A of the selected image pixel p using Equation (1) and the bilateral weights of Equation (3). Accordingly, the depth values are weighted in accordance with determined weights. After determining the refined depth value for image pixel p in either step 770 or the step 780, the method 700 returns to step 720 to check whether there are more pixels of the image I 525 to be processed.

As described above, an extension to the conventional joint bilateral filter (JBF) are defined with an additional Gaussian range filter on depth. While the non-depth related range filters are limited by a colour weight, other appropriate functions may be used in place of the Gaussian function for the range filters. Further, range filters on other image attributes, such as texture, may be used in place of or together with the colour weight.

Utilising Confidence Measure

Some depth acquisition methods including some depth from defocus (DFD) methods, produce a confidence measure along with each depth estimate. That is, these depth acquisition methods produce a depth map of a scene and an associated confidence map. In this case, the bilateral weight of Equation (5) can be further extended to include a confidence weight, $g(C_q)$, in accordance with Equation (6) as follows:

$$w(q,p)=g(C_q)G_{\sigma_s}(\|q-p\|)G_{\sigma_r}(\|I_q-I_p\|)G_{\sigma_d}(\|D_q-D_{ref(p)}\|) \quad (6)$$

where $C_q$ is the confidence score for the depth estimates at pixel q, g(•) is a non-decreasing function and g(•) is between [0,1] in the interval [0,1]. The confidence weight $g(C_q)$ gives lower weights to depth estimates of those local pixels with lower confidence scores.

Figure 3:
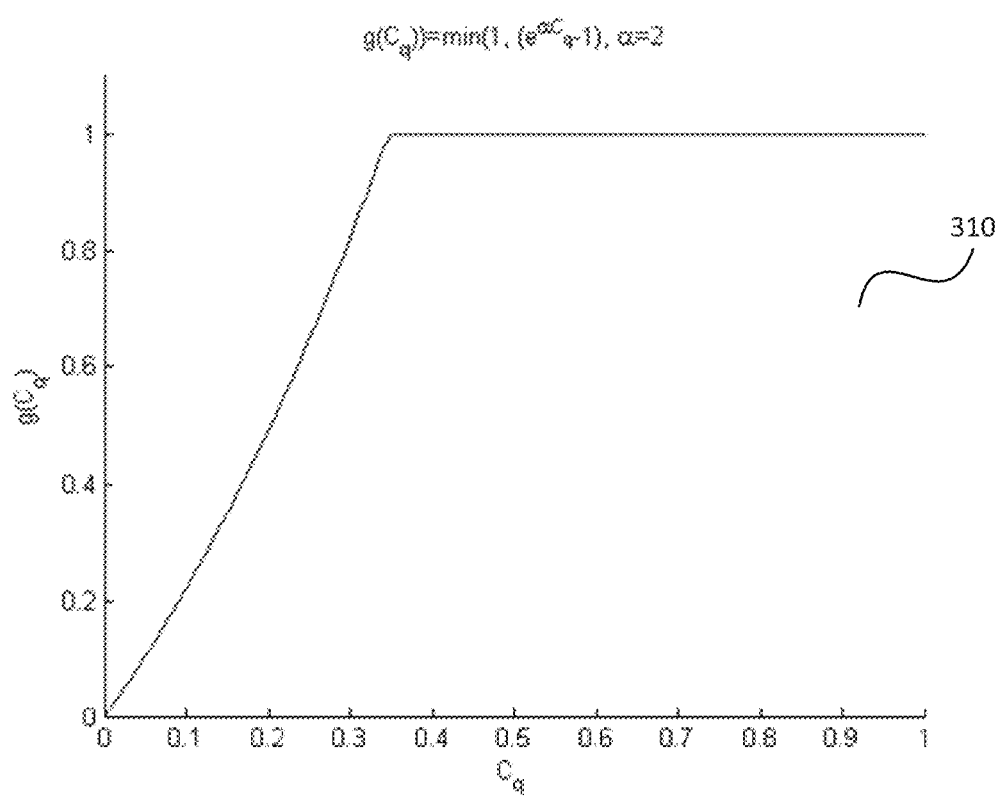
FIG. 3 is a plot showing how a confidence weight, $g(C_q)$, changes as a confidence score $C_q$ varies from zero (0) to one (1)

In one arrangement, the confidence weight $g(C_q)$ is defined in accordance with Equation (7), as follows $$g(C_q)=\min(1,(e^{\alpha C_q}-1)) \quad (7)$$

where the parameter α controls the confidence score below which the confidence weight will start to have an effect on the bilateral weights. Graph 310 of FIG. 3 shows how the confidence weight, $g(C_q)$, changes as the confidence score $C_q$ varies from zero (0) to one (1) when α is set to two (2). With α set to two (2), only depth estimates with confidence score $C_q<0.35$ will have their bilateral weights w(q, p) reduced, to avoid excessively penalising regions with less texture which are typically associated with lower confidence scores.

Steps 660 and 760, where a reference depth is set for an image pixel p, can also be adjusted to utilise the confidence score. In particular, selection of similar local pixels for determining the reference depth can be adjusted. Instead of selecting similar local pixels according to corresponding colour weights, $G_{\sigma_r}(\|I_q-I_p\|)$, the local pixels are selected according to the product of their confidence weight and colour weights (i.e., the value of the product $g(C_q)G_{\sigma_r}(\|I_q-I_p\|)$).

Interpolating Missing Depth for Occluded Regions

The depth from defocus (DFD) method relies on relative blur between two or more images for estimating depth. Object and camera motion in between the capture of the images may result in occluded regions that appear in only one of the images. Hence, relative blur cannot be determined from these occluded regions, and the occluded regions have no depth from defocus (DFD) depth estimate.

A similar problem may arise in stereo depth methods which rely on disparity between a pixel in a left and a right image of a scene to estimate depth. In the case of stereo depth methods, the occluded regions are caused by different viewpoints of the scene in the left and the right image. A common method of identifying regions of occlusion is to determine regions where the optical flow (i.e., the apparent motion of a pixel between two images of a scene) from a first image to a second image and the optical flow from the second image to the first image are inconsistent.

The missing depth estimates of an occluded region typically have to be first interpolated from the available depth estimates surrounding the occluded regions before a joint bilateral filter (JBF) can be applied to refine the depth map. To allow the joint bilateral filter (JBF) to interpolate the missing depth estimates as well as refine the depth map of an occluded region, the domain filter of the extended joint bilateral filter (JBF) can be modified to bias the interpolated depth values towards background depth values. More specifically, depth estimates of foreground pixels are given small (bilateral) weights unless the current pixel is very close to the foreground regions of the image.

To interpolate missing depth values near a depth boundary, a local window of sufficient size has to be used to cover known pixels on both sides of the depth boundary. However, an occluded region exposed by a fast moving object can be very wide. For an occluded region exposed by a fast moving object, using a local window with a fixed radius is problematic. If the fixed radius is too small, then a radius and the window may not cover known pixels on both sides of an occluded region. If the fixed radius is too large, then there will be a lot of unnecessary computation for the smaller occluded regions.

Instead of using a local window with fixed radius, each region to be interpolated uses a t-pixel thick layer of depth estimates surrounding the region for input depth data. If there are more than L depth estimates in the surrounding band of depth estimates, a maximum of L depth estimates closest to a pixel to be interpolated are selected for interpolating that pixel in order to limit the amount of computation. In one arrangement, t is set to two (2) and L is set to nine-hundred (900). As an example, FIG. 4A shows a depth map 410 of the image 418 shown in FIG. 4B. The depth map 410 has an occluded region 416 (marked in black) caused by a moving mannequin 412 in the foreground against a static background 414. FIG. 4C shows a set 420 of available depth estimates that can be used for interpolating the occluded region 416. The set 420 includes a 2-pixel thick layer of available depth estimates surrounding the occluded region 416 with one band of depth estimates 422 from the foreground and a second band of depth estimates 424 from the background. FIG. 4D shows a subset 430 of a number, L, of depth estimates that will be used for interpolating the depth of the pixel 432 in the occluded region 416. The subset 430 includes foreground pixels 434 and background pixels 436.

For each image pixel p to be interpolated, a depth value $\hat{D}_p$ for the image pixel p is determined as a weighted sum of the depth of the selected input pixels, in accordance with Equation (8), as follows:

$$\hat{D}_p = \frac{1}{Z_p}\sum_{q\in S} w(q,p)D_q \quad (8)$$

where p, q are pixel locations, S is the set of selected input pixels, $D_q$ is the depth value at location q, and w(q, p) is the bilateral weight for $D_q$. $Z_p$ is a normalisation factor, which may be determined in accordance with Equation (9), as follows:

$$Z_p = \Sigma_{q \in S} w(q,p). \quad (9)$$

However, the domain filter $G_{\sigma_l}(\|q-p\|)$ of the bilateral weight $w(q, p)$ of Equation (5) is replaced with the a new location weight, $w_{oc}$, that biases the interpolated value towards the depth values of the background pixels in the input data. The depth values of the foreground pixels in the input data are only given significant weights when the pixel to be interpolated is close to the foreground pixels. Specifically, using a convention that assigns higher depth value to foreground pixels and lower depth value to background pixels, the bilateral weight, $w(q, p)$, is defined in accordance with Equation (10), as follows:

$$w(q,p) = w_{oc}(M_{pq} - M_{ref(p)}) G_{\sigma_r}(\|I_q - I_p\|) G_{\sigma_d}(\|D_q - D_{ref(p)}\|) \quad (10)$$

where $M_{pq} = D_q\|q-p\|$ is the product of the depth of pixel q and a corresponding distance from image pixel p—a quantity that may be referred to as depth moment. Reference depth moment $M_{ref(p)}$ is the median of the depth moments among the input data samples, and $$w_{oc}(x) = 0.5(1 - \tan h(x)). \quad (11)$$

Figure 8:
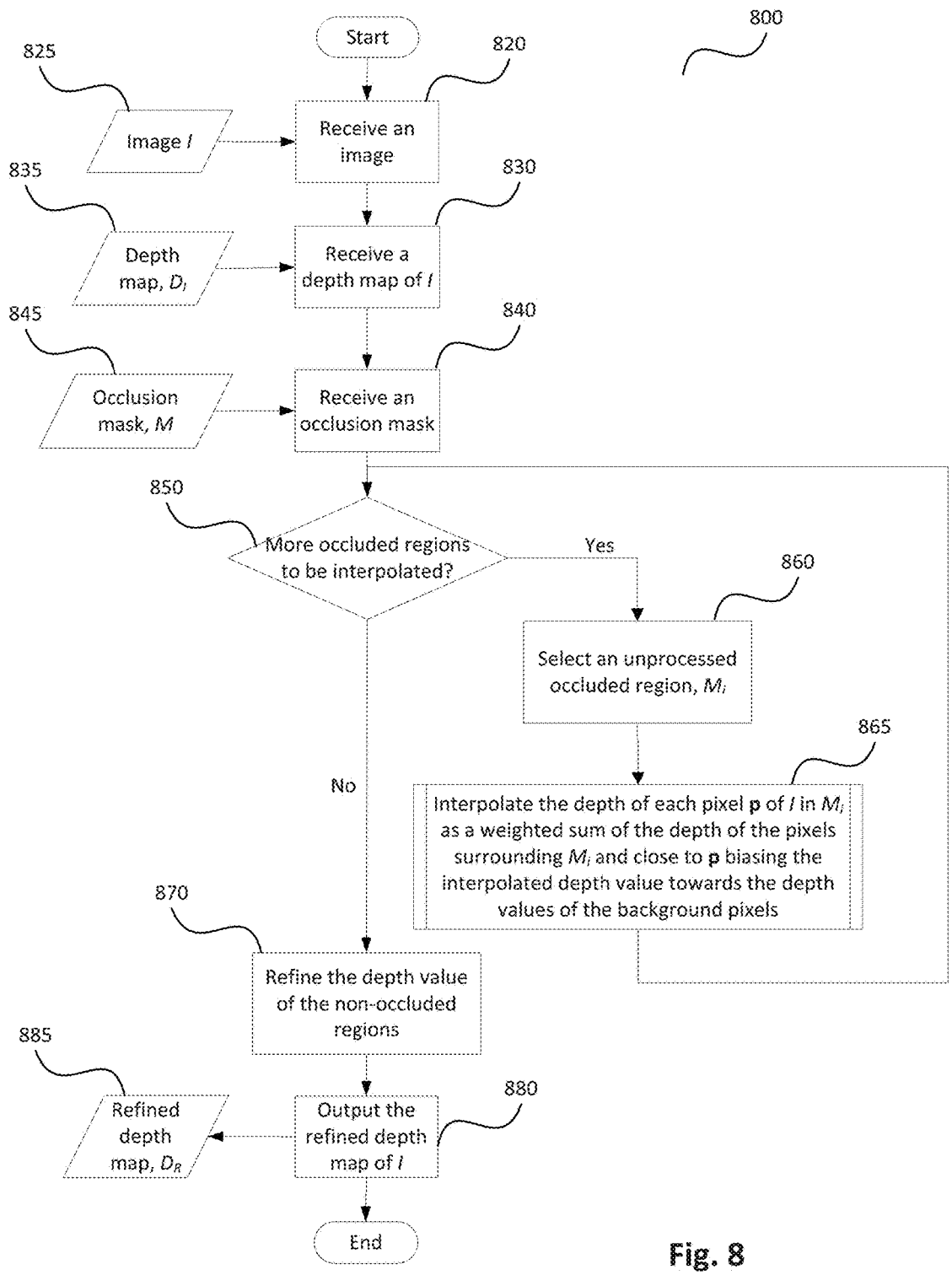
FIG. 8 is a schematic flow diagram showing a method of determining a high resolution depth map corresponding to an image of scene.

FIG. 4E shows results using method 800, as described below with reference to FIG. 8, to interpolate the occluded region 416 of the input depth map 410. The depth boundaries of the mannequin in FIG. 4E closely match actual boundaries of the mannequin in the image 418. Interpolated depth values are consistent with available depth estimates of the foreground and background objects.

The method 800 of determining a high resolution depth map corresponding to an image I 825 of a scene. The method 800 may be used to refine depth maps that include occluded regions with missing depth values. The method 800 may be implemented as one or more software code modules of the software application program 133 resident on the hard disk drive 110 and being controlled in its execution by the processor 105.

The method 800 begins at receiving step 820, where an image I 825 is received as input, under execution of the processor 105. At a next receiving step 830, an associated low-resolution depth map $D_I$ 835 of the image I 825 is received as input. Then at a next step 840, an occlusion mask M 845 that marks the occluded regions in the depth map $D_I$ is received as input under execution of the processor 105. The image I 825, the low-resolution depth map $D_I$ 835 and the occlusion mask M 845 may be stored in the memory 106. Alternatively, the image I 825, the low-resolution depth map $D_I$ 835 and the occlusion mask M 845 may be received from an external data source (not shown) connected to the network 120 or the disk storage medium 125. In still another arrangement, the image I 825, the low-resolution depth map $D_I$ 835 and the occlusion mask M 845 may be received from a software application program, such as the software application program 133, executing on the computer 101.

Then at a checking step 850, if there are more occluded regions in the occlusion mask M 845 that needs to be interpolated, then the method 800 proceeds to selecting step 860. At step 860, a next unprocessed occluded region $M_i$ to be interpolated is selected under execution of the processor 105.

Then at interpolating step 865, the depth value for each image pixel p in occluded region $M_i$ is interpolated as a weighted sum of the depth values corresponding to each of the pixels surrounding the occluded region $M_i$ and close to image pixel p. The depth values are weighted in accordance with determined weights. The weights are set so as to bias the interpolated depth value of image pixel p towards the depth values of the background pixels. Foreground pixels receive significant weights if the foreground pixels are very close to the image pixel p. A method 900 of interpolating depth values in the occluded region $M_i$, as executed at step 865, will be described below with reference to FIG. 9.

After interpolating the depth value of the occluded region $M_i$ in the step 865, the method 800 returns to step 850 to check whether there are more occluded regions to be interpolated. If at step 850 no more occluded region needs to be processed, then the method 800 proceeds to refining step 870. At step 870, the depth value of the non-occluded regions of the image I 825 are refined, under execution of the processor 105, using the method 500 of FIG. 5. Following step 870, the method 800 proceeds to determining step 880, where a fully refined depth map $D_R$ 885 corresponding to the image I 825 is determined from the refined depth values determined in step 870 and the interpolated depth values determined at step 865. The refined depth map $D_R$ 885 is a high resolution depth map. The refined depth map $D_R$ 885 is output to a data sink (not shown) over the network 120. Alternatively, refined depth map $D_R$ 885 may be stored in the memory 106 or the disk storage medium 125. In still another arrangement, refined depth map $D_R$ 885 may be passed to a software application program, such as the software application program 133 executing on the computer 101.

Figure 9:
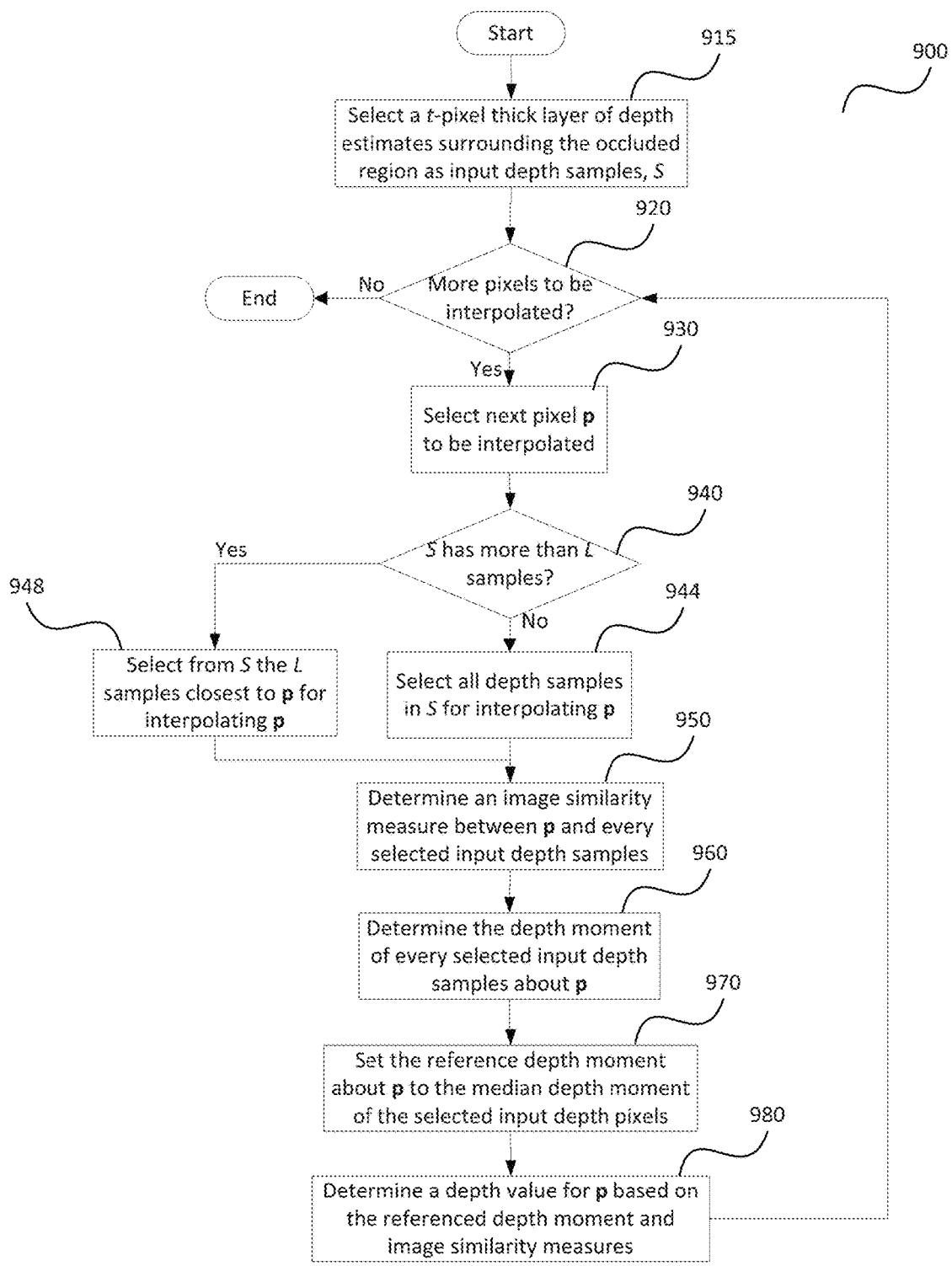
FIG. 9 is a schematic flow diagram showing a method of interpolating depth values in an occluded region as used in the method of FIG. 8.

The method 900 of interpolating depth values in the occluded region $M_i$, as executed at step 865, will be described below with reference to FIG. 9. The method 900 may be implemented as one or more software code modules of the software application program 133 resident on the hard disk drive 110 and being controlled in its execution by the processor 105.

The method 900 commences at selecting step 915, where a t-pixel thick layer of available depth estimates surrounding the occluded region $M_i$ is selected, under execution of the processor 105, to be used as input depth samples S for interpolating the occluded region $M_i$. The input depth samples S may be stored in the memory 106. In one arrangement, t is set to two (2). Then in a checking step 920, if there are no more pixels in the occluded region $M_i$ to be interpolated, then the method 900 concludes. If there are more pixels to be interpolated, the method 900 proceeds to step 930 where a next image pixel p to be interpolated is selected from the occluded region $M_i$.

At a next step 940, if the number of samples in the input depth samples S is not larger than a predefined maximum number of samples L, then the method 900 proceeds to selecting step 944.

At selecting step 944, all the samples in the input depth samples S are selected for interpolating the depth of the image pixel p. Otherwise, if the number of samples in the input depth samples S is larger than the maximum number, L, then the method 900 proceeds to selecting step 948.

At step 948, an L number of samples in the input depth samples S that are spatially closest to the selected image pixel p are selected, under execution of the processor 105, for interpolating the image pixel p.

Then at a determining step 950, an image similarity measure between the image pixel p and every selected input sample is determined. In one arrangement, the colour weights, $G_{\sigma_r}(\|I_q - I_p\|)$, between the image pixel p and every pixel q in the selected samples (i.e., the samples selected at either of steps 944 or 948) are used as the similarity measures at step 950.

The method 900 continues at a determining step 960, where a depth moment of every pixel q in the selected samples about image pixel p is determined under execution of the processor 105. At a setting step 970, a reference depth moment about image pixel p is set to the median depth moment of the selected samples. Then, in a determining step 980, a depth value for image pixel p is determined based on the reference depth moment determined in step 980 and the image similarity measures determined in step 950. In one arrangement, the depth value for image pixel p is determined as a weighted sum of the depth value of the samples selected for interpolating image pixel p using Equation (1) and the bilateral weight w(q, p) is determined in accordance with Equation (12), as follows:

$$w(q,p)=w_{oc}(M_{pq}-M_{ref(p)})G_{\sigma_r}(\|I_q-I_p\|) \quad (12)$$

where $M_{pq}=D_q\|q-p\|$ is the depth moment of pixel q about image pixel p and $M_{ref(p)}$ is the reference depth moment.

In another arrangement, the depth value for image pixel p is interpolated using Equation (1) and the bilateral weights of Equation (10). In such an arrangement, step 650 and step 660 of method 600 are included and are executed before step 980 to determine the parameters for the Gaussian range filter on depth $G_{\sigma_d}(\cdot)$.

After interpolating the depth value of image pixel p at step 980, the method 900 returns to step 920 to check whether there are more pixels in the occluded region $M_i$ for interpolation.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of determining a high resolution depth map corresponding to an image of a scene, said method comprising:
   receiving the image and an input depth map corresponding to the image;
   selecting, from a window region about an image pixel of the image, a plurality of pixels having a substantially similar characteristic value as the image pixel;
   determining a reference depth value for the image pixel from depth values in the input depth map which correspond to each of the selected pixels;
   determining weights for each pixel within the window region based at least on a difference between a depth value corresponding to each of the selected pixels and the determined reference depth value for the image pixel;
   determining a refined depth value for the image pixel from a weighted sum of the depth values corresponding to each of the selected pixels, said depth values being weighted in accordance with the determined weights; and
   determining a high resolution depth map corresponding to the image from the refined depth value.

2. The method according to claim 1, wherein a window region is determined for each image pixel of said image.

3. The method according to claim 1, further comprising determining an image similarity measure between the image pixel and at least one of said selected pixels.

4. The method according to claim 1, further comprising determining an image similarity measure between the image pixel and at least one of said selected pixels, wherein the reference depth value is based on median depth of said selected pixels.

5. The method according to claim 1, further comprising determining an image similarity measure between the image pixel and at least one of said selected pixels, wherein the reference depth value is based on the image similarity measure.

6. The method according to claim 1, wherein the high resolution depth map is determined using an occlusion mask corresponding to image.

7. The method according to claim 1, further comprising selecting an occluded region within the input depth map wherein the high resolution depth map is determined using an occlusion mask corresponding to image.

8. The method according to claim 1, further comprising selecting an occluded region within the input depth map, wherein the high resolution depth map is determined using an occlusion mask corresponding to image, and wherein depth values are interpolated with the occluded region.

9. The method according to claim 1, further comprising interpolating depth values for the image pixel.

10. The method according to claim 1, further comprising interpolating depth values for the image pixel, wherein the depth values for the image pixel are interpolated as a weighted sum of depth values corresponding to each of the selected pixels.

11. A system for determining a high resolution depth map corresponding to an image of a scene, said system comprising:
    a memory for storing data and a computer program;
    a processor coupled to the memory for executing the computer program, the computer program comprising instructions for:
    receiving the image and an input depth map corresponding to the image;
    selecting, from a window region about an image pixel of the image, a plurality of pixels having a substantially similar characteristic value as the image pixel;
    determining a reference depth value for the image pixel from depth values in the input depth map which correspond to each of the selected pixels;
    determining weights for each pixel within the window region based at least on a difference between a depth value corresponding to each of the selected pixels and the determined reference depth value for the image pixel;
    determining a refined depth value for the image pixel from a weighted sum of the depth values corresponding to each of the selected pixels, said depth values being weighted in accordance with the determined weights; and
    determining a high resolution depth map corresponding to the image from the refined depth value.

12. An apparatus for determining a high resolution depth map corresponding to an image of a scene, said apparatus comprising:

means for receiving the image and an input depth map corresponding to the image;

means for selecting, from a window region about an image pixel of the image, a plurality of pixels having a substantially similar characteristic value as the image pixel;

means for determining a reference depth value for the image pixel from depth values in the input depth map which correspond to each of the selected pixels;

means for determining weights for each pixel within the window region based at least on a difference between a depth value corresponding to each of the selected pixels and the determined reference depth value for the image pixel;

means for determining a refined depth value for the image pixel from a weighted sum of the depth values corresponding to each of the selected pixels, said depth values being weighted in accordance with the determined weights; and means for determining a high resolution depth map corresponding to the image from the refined depth value.

13. A non-transitory computer readable medium having a computer program stored thereon for determining a high resolution depth map corresponding to an image of a scene, said program comprising:

code for receiving the image and an input depth map corresponding to the image;

code for selecting, from a window region about an image pixel of the image, a plurality of pixels having a substantially similar characteristic value as the image pixel;

code for determining a reference depth value for the image pixel from depth values in the input depth map which correspond to each of the selected pixels;

code for determining weights for each pixel within the window region based at least on a difference between a depth value corresponding to each of the selected pixels and the determined reference depth value for the image pixel;

code for determining a refined depth value for the image pixel from a weighted sum of the depth values corresponding to each of the selected pixels, said depth values being weighted in accordance with the determined weights; and code for determining a high resolution depth map corresponding to the image from the refined depth value.

* * * * *